United States Patent [19]
Young

[11] Patent Number: 5,871,063
[45] Date of Patent: Feb. 16, 1999

[54] SEAT BELT LATCH SENSOR SYSTEM

[75] Inventor: James M. Young, Brighton, Mich.

[73] Assignee: Automotive Systems Laboratory, Inc., Farmington Hills, Mich.

[21] Appl. No.: 10,421

[22] Filed: Jan. 21, 1998

Related U.S. Application Data

[60] Provisional application No. 60/035,674, Jan. 22, 1997.

[51] Int. Cl.⁶ .......................... B60R 21/32; B60R 22/46; B60R 22/48

[52] U.S. Cl. .......................... 180/268; 280/735; 280/806; 340/457.1; 24/641

[58] Field of Search ..................................... 180/268, 269, 180/270; 280/735, 806, 801.1; 340/457.1; 24/641, 637, 633

[56] References Cited

U.S. PATENT DOCUMENTS

| | | | |
|---|---|---|---|
| 4,571,471 | 2/1986 | Haglund | 180/270 |
| 4,899,424 | 2/1990 | Barnes et al. | 24/641 |
| 5,590,904 | 1/1997 | Ellis et al. | 280/735 |
| 5,752,299 | 5/1998 | Vivacqua et al. | 24/633 |

*Primary Examiner*—Peter C. English
*Attorney, Agent, or Firm*—Lyon, P.C.

[57] ABSTRACT

A diagnosable seat belt latch system for use in a vehicle seat belt system provides a latch assembly incorporating a force sensitive sensor interposed between a latch housing and a pressure distribution bushing. A pivoting latch arm having a latch tab at one end for engaging an orifice of a seat belt buckle transfers a compressive load to the force distribution bushing and thereby to the force sensor. A signal processor diagnoses the force sensor to determine whether the seat belt is latched and generates a signal to a vehicle safety restraint system based on the determination.

7 Claims, 2 Drawing Sheets

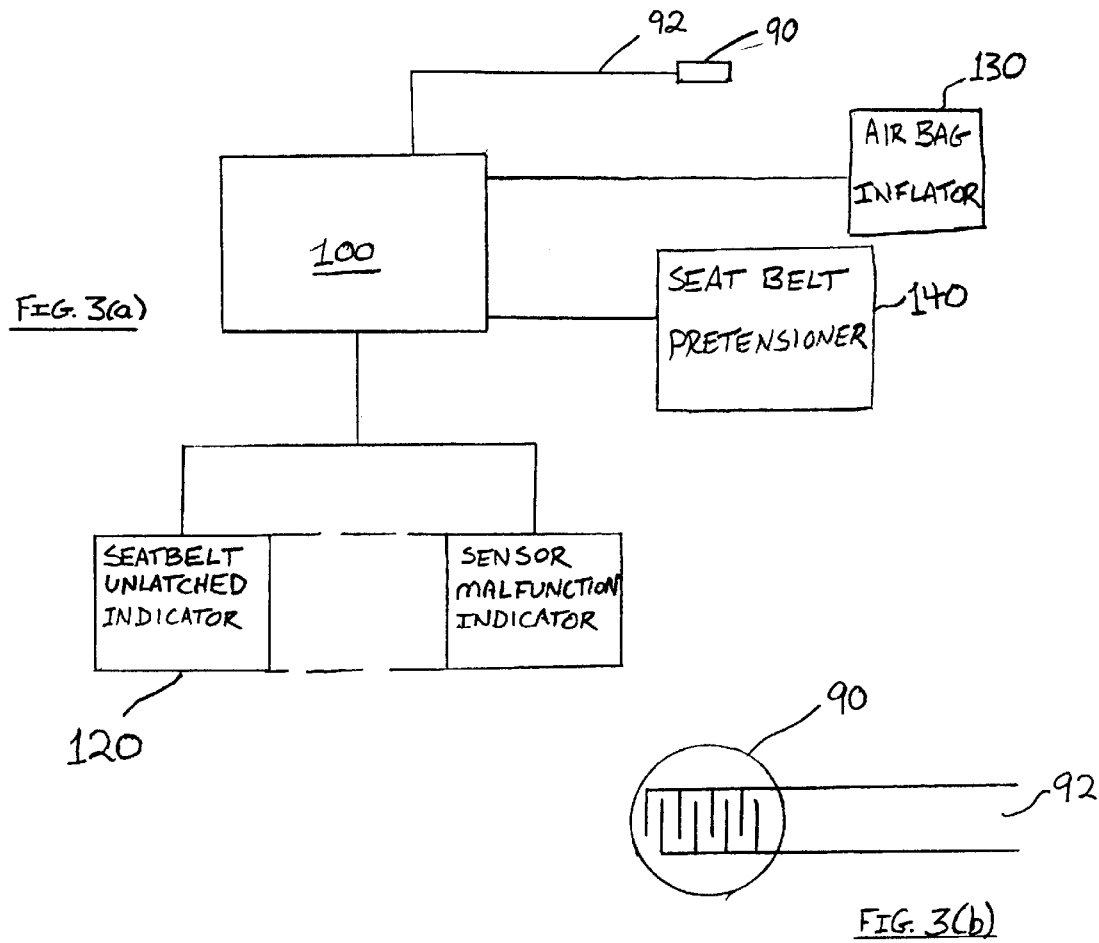
FIG. 3(a)
FIG. 3(b)
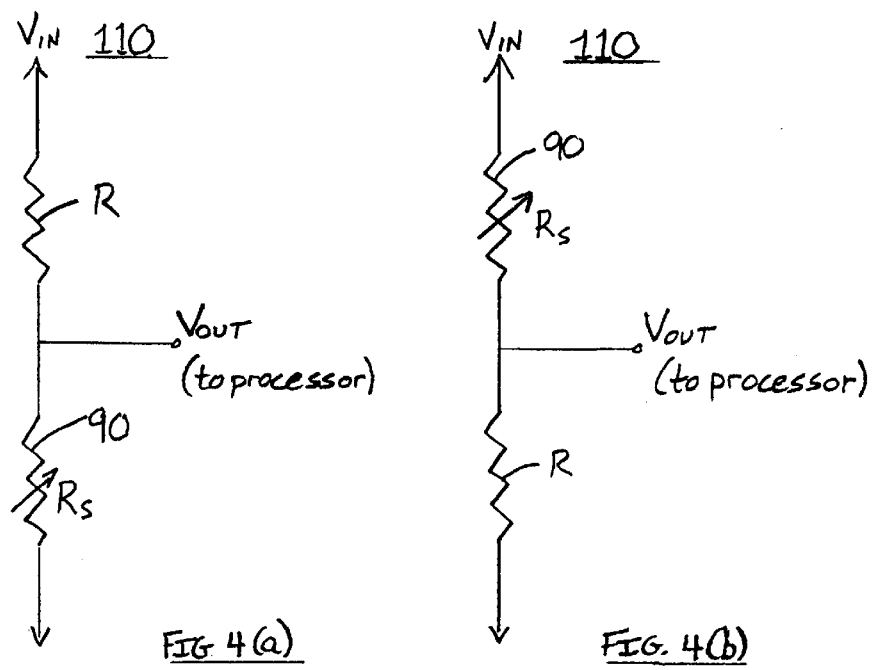
FIG. 4(a)
FIG. 4(b)

SEAT BELT LATCH SENSOR SYSTEM

CROSS-REFERENCE TO RELATED APPLICATIONS

The instant application claims the benefit of prior U.S. Provisional Application Ser. No. 60/035,674 filed Jan. 22, 1997.

TECHNICAL ART

The instant invention generally relates to vehicle passenger restraint systems and more particularly to a system for diagnosing the proper operation of a seat belt latching system.

BACKGROUND OF THE INVENTION

A vehicle may contain several types of safety restraint systems that are activated responsive to a vehicle crash or are employed prior to a vehicle crash for purposes of mitigating occupant injury. Examples of such restraint systems include air bags, seat belt systems including seat belt pretensioners, and deployable knee bolsters.

Since the object of these safety restraint systems is to mitigate occupant injury in the event of a collision, it is desirable that they operate reliably. For this reason, it is generally desirable to be able to sense the operability of vehicle safety systems prior to a collision so that in the event that such a system becomes inoperative corrective action may be taken.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants at greater risk for injury when exposed to higher severity crashes.

Generally, occupants who are unbelted or improperly belted are at greater risk of injury in a crash than are properly belted occupants, whether or not the occupant is protected by an air bag inflator, even for relatively mild collisions.

Known mechanisms for sensing the latching of a seat belt buckle to a seat belt latch use a seat belt latch assembly employing one or more mechanical switches to sense proper closure of the latch. However, such mechanical switches are expensive, unreliable, and typically can not be diagnosed by a processor. A mechanical switch employing a set of switch contacts to open or close a circuit thereby indicating the seat belt latch state to a processor operatively connected thereto does not have the ability to inform the processor of whether the switch has malfunctioned in an open or closed state. For example, a set of mechanical switch contacts stuck in an open state appears to the processor as an unlatched seat belt, i.e., an open circuit condition. Conversely, a set of mechanical switch contacts stuck in a closed state appears to the processor as a latched seat belt, i.e., a closed or short circuit condition.

SUMMARY OF THE INVENTION

The instant invention overcomes the above-noted problems by providing a seat belt latch system employing a sensor which generates an indication to a processor of the state of the seat belt latch and of the proper operation of the sensor. More particularly, by providing a seat belt latch sensor having a continuous or analog output, a processor can determine if the sensor has malfunctioned by determining if the sensor output is outside of its normal range of operation. This information may be used to activate an occupant warning indicator when a sensor malfunction is detected by the processor or to modify the inflation profile of an airbag inflator when an unlatched seat belt is detected.

By analyzing whether the vehicle seat belts are properly latched, corrective action may be taken to further protect a vehicle occupant either by alerting the occupant or by adapting other restraint system components, such as the air bag system, to compensate for this deficiency.

The ability to sense a latched or unlatched state of a seat belt buckle may be used in conjunction with a seat weight sensor to determine the presence of an occupant in a vehicle seat and whether that occupant is utilizing the seat belt system. This information may be used to either activate a warning indicator, deactivate seatbelt pretensioners, and/or modify the inflation profile of an air bag system.

By adjusting the power and energy levels of the air bag inflator corresponding to the occupant's failure to use a seat belt, a more aggressive air bag inflation rate may be used for unbelted occupants thereby providing greater restraint from the air bag to compensate for the lack of restraint from the seat belt. Furthermore, by sensing the operative state of the seat belt latch, a reduced inflation rate may be used where possible for occupants who are properly belted so as to reduce their risk of injury from the inflating air bag. Therefore, a sensor that can reliably monitor the state of a seat belt latch may be used to great advantage in vehicle safety systems.

In accordance with the present invention, at least one thin resistive pressure sensor is incorporated in a seat belt latch assembly to provide information about the operational status of the seat belt latching mechanism to a processor. Resistive pressure sensors convert physical pressure or force to electrical resistance. Typically, resistive pressure sensors decrease in resistance as pressure increases and have an operating resistance that typically ranges from several megohms to a few kilohms. The present invention takes advantage of the fact that a finite, nonzero resistance is always present at the sensor output to perform routine diagnosis of the latch mechanism status. Open and short circuits in the sensor loop, as may be caused by a failed latch mechanism, are detected by a processor means. The vehicle driver can thereafter be alerted to any potential latch malfunctions.

Furthermore, the instant invention provides a force sensitive sensor incorporating at least one force sensitive resistance element disposed between a force distribution bushing and a seat belt latch housing. The force distribution bushing is compressed by a latch arm and acts to transfer the compressive load to the force sensitive resistive element, wherein the resulting resistance of the force sensitive resistive element is inversely related to the magnitude of the associated compressive load.

In one embodiment of the instant invention, the force sensitive resistive element is used to provide a variable resistance measurement to a processor. Alternatively, and in accordance with the preferred embodiment of the instant invention, the force sensitive resistive element may be employed as one leg of a voltage divider circuit having an output that varies depending upon the amount of resistance present in the force sensitive resistive element. The output of the voltage divider circuit is thereby provided to the processor to indicate the state of the seat belt latch.

Examples of force sensitive resistive element sensors that may be employed in the instant invention are sensors manufactured by Interlink Electronics™, International Microelectronics Research Corporation's IMRC Prescon™ sensors with low actuation threshold, Force Imaging Technologies™ sensors, and Teckscan™ sensors. Moreover, carbon materials, such as utilized in microphones, are known to have a force sensitive resistance and can be incorporated in a sensing element in accordance with the instant invention.

Although the preferred embodiment of the invention utilizes a conventional microprocessor, it is readily understood by one having ordinary skill in the art that alternative means such as relay logic circuitry, analog processors, analog to digital converters and TTL logic circuitry may be employed as processor means to practice the instant invention.

Therefore, one object of the present invention is to provide a seat belt latch system which can reliably sense the mating of a vehicle seat belt buckle to a seat belt latch.

A further object of the present invention is to provide a seat belt latch system utilizing a latch sensor which is diagnosable by a conventional processor means, whereby sensor short circuit and open circuit conditions can be detected.

A yet further object of the present invention is to provide an indicator for warning an occupant when a seat belt latch sensor malfunction has occurred.

A yet further object of the present invention is to provide an indicator for warning an occupant when the seat belt buckle is not engaged in the seat belt latch, thereby reminding the occupant to utilize the seat belt system.

A yet further object of the present invention is to provide an improved seat belt latch sensor which is sufficiently reliable to be incorporated into a safety restraint system for controlling the activation thereof.

The present invention will be more fully understood after reading the following detailed description of the preferred embodiment with reference to the accompanying drawings. While this description will illustrate the application of the instant invention in a vehicular seat belt restraint system, it will be understood by one with ordinary skill in the art that the instant invention can also be applied to other types of systems employing latch mechanisms.

BRIEF DESCRIPTION OF THE DRAWINGS

FIG. 3A is a block diagram of a processor means connected to the output of a force sensitive resistive element.

FIG. 3B is a detail view of a force sensitive resistive element.

FIG. 4A is a circuit diagram of a voltage divider circuit in accordance with the instant invention.

FIG. 4B is a circuit diagram of an alternative voltage divider circuit in accordance with the instant invention.

DETAILED DESCRIPTION OF THE PREFERRED EMBODIMENT(S)

Figure 1:
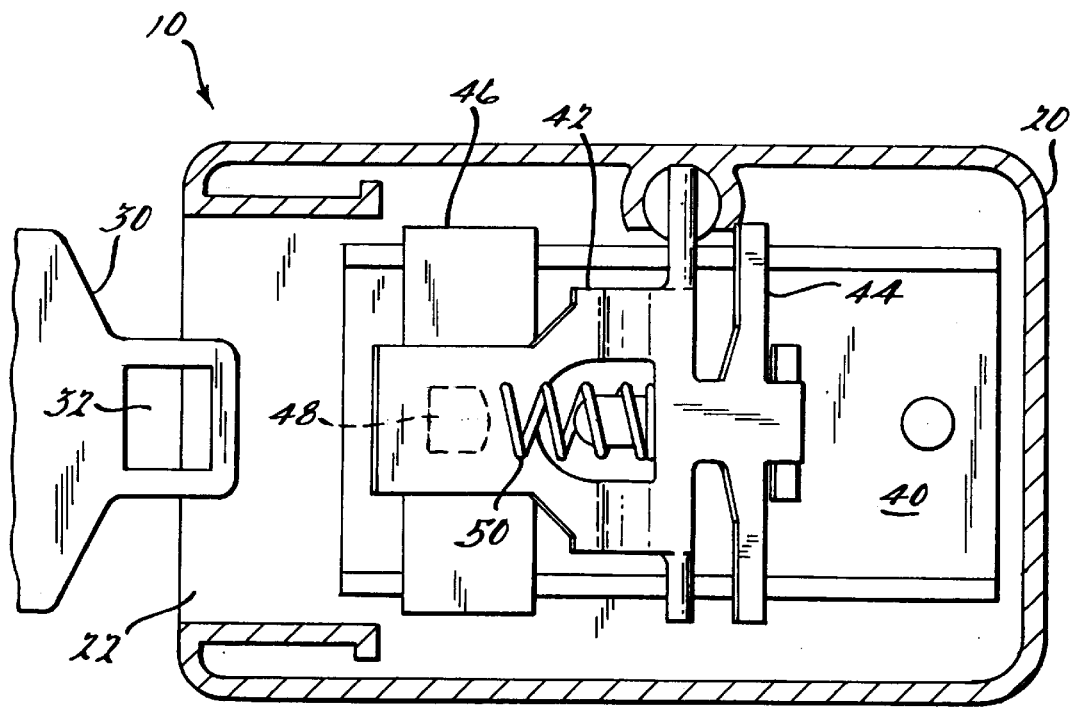
FIG. 1 is a top view of a seat belt latch assembly in accordance with the instant invention.
Figure 2:
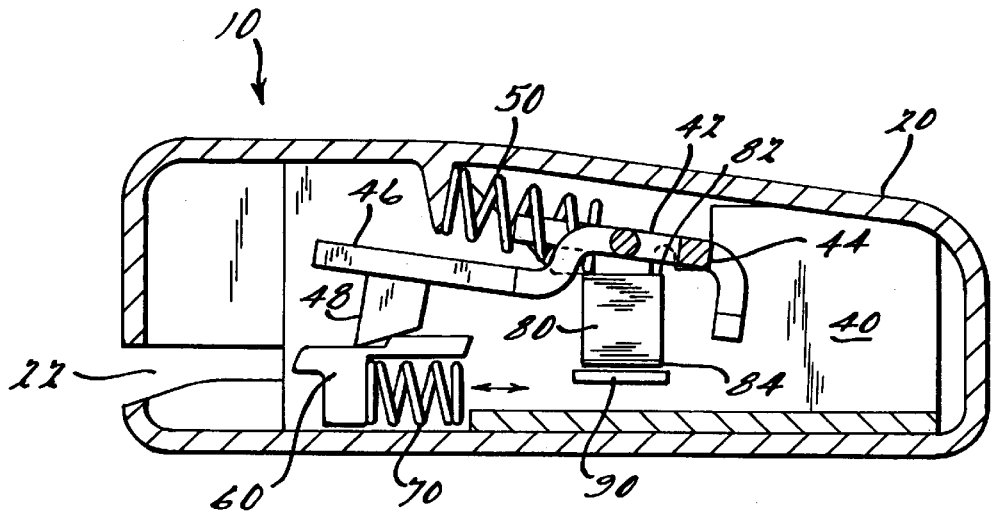
FIG. 2 is a side view of the seat belt latch assembly shown in FIG. 1.

Referring to drawing FIGS. 1 and 2 and in accordance with one embodiment of the present invention, a diagnosable seat belt latch system 10 for use in a vehicle seat belt latch assembly has a latch housing 20 provided with a slot 22 at one end for slidably engaging a seat belt buckle 30 having an orifice 32.

The latch housing 20 encloses a latch assembly 40 comprised of a latch arm 42 having a first end 44 pivotally mounted to the latch housing 20. A second end 46 of the latch arm 42 is provided with a latch tab 48 which is shaped to engage the orifice 32 of the seat belt buckle 30 thereby retaining the buckle 30 inside the housing 20. The latch assembly 40 also includes a first spring 50 which biases the second end 46 of the latch arm 42 towards the slot 22 of the latch housing 20.

The latch assembly 40 is further provided with a latch rest 60 positioned adjacent the slot 22 of the latch housing 20 such that the latch tab 48 abuts the latch rest 60 when the seat belt buckle 30 is not engaged in the housing 20.

As shown in FIG. 2 the latch rest 60 is mounted to housing 20 in a slidably movable fashion and is connected to a second spring 70 for biasing the latch rest 60 towards the slot 22 of the housing 20. When the seat belt buckle 30 is inserted in the housing slot 22, the latch rest 60 is displaced by the buckle 30 and thereby slidably moves against second spring 70 until the orifice 32 of the seat belt buckle 30 is engaged by the latch tab 48.

Referring to FIGS. 1 and 2 and in accordance with an embodiment of the instant invention, the latch assembly 40 further includes a pressure distribution bushing 80 having a first end 82 abutting the latch arm 42. The pressure distribution bushing 80 is typically a piece of rubber or plastic material used to transfer pressure from one body to another. A force sensor 90 is mounted to the housing 20. A second end 84 of pressure distribution bushing 80 abuts and is in proximate contact with the force sensor 90. The pressure distribution bushing 80 distributes the pressure generated from the latch arm 42 motion across the surface of the force sensor 90. The size and composition of the pressure distribution bushing 80 are tuned to the tolerance stack-ups of the latch assembly 40 and the actuation force of the force sensor 90. Ideally, the sensor means 90 should have little or no pressure applied to it when the latch assembly 40 is open (unlatched) and maximum pressure applied when the latch assembly 40 is closed (latched).

When the buckle 30 is not inserted into the housing slot 22, latch rest 60 abuts latch tab 48, thereby biasing latch arm 42 against the first spring 50. This "at rest" or unlatched position of the latch assembly 40 provides for a minimum threshold level of force acting upon the force sensor 90 which is continuously being distributed by the pressure distribution bushing 80.

When the buckle 30 is inserted into the housing slot 22, the latch rest 60 is contacted by the buckle 30 and thereby biased against the second spring 70. This action causes the latch rest 60 to slide underneath and away from the latch tab 48, thereby allowing the latch arm 42 to be further biased towards slot 22 by first spring 50. The latch arm 42 travels toward the buckle 30 until the latch tab 48 engages the orifice 32 of the buckle 30. This latched position of the assembly 40 provides for a greater level of force on the force sensor 90 as latch arm 42 is biased further against pressure distribution bushing 80 than when in the unlatched state.

The second spring 70 provides a sufficient bias force against the latch rest 60 to slide the latch rest 60 underneath the latch tab 48 when the buckle 30 is not engaged in the slot 22, thereby biasing the latch arm 42 against the first spring 50 and returning the latch assembly 40 to the unlatched position.

The force sensor 90 is provided with an output 92 responsive to changes in the amount of force applied to the sensor means 90. This output 92 is operatively coupled to a processor 100 which has a means for analyzing the output 92 to determine whether the level of force on said sensor 90 as represented by the output 92 is indicative of a latched or unlatched seat belt.

In a preferred embodiment of the invention, the force sensor 90 is comprised of a force sensitive resistive element as shown in FIG. 3B. Pressure transferred through the pressure distribution bushing 80 to the force sensitive resistive element 90 causes the resistance of the resistive element 90 to vary in inverse relation to the magnitude of the compressive load component acting on the element 90. A processor 100 having a means for measuring electrical resistance may be operatively connected to the output 92 of the resistive element 90 and thereby measure the resistance through the element 90. A resistance greater than a predetermined maximum threshold or less than a predetermined minimum threshold as measured by the processor means provides an indication of the status of the latch assembly 40. A resistance measurement from the force sensitive resistive element 90 below the predetermined minimum threshold would indicate a latched belt and a resistance measurement above the predetermined maximum threshold would indicate an unlatched belt.

A force sensitive resistive element 90 typically operates in a resistance range between several megohms to several kilohms. By providing the processor 100 with the exact design specifications for the resistive element 90 employed, open and short circuit conditions in the output 92 of the resistive element 90 may be diagnosed. For example, if the processor means for measuring resistance detects a resistance through the force sensitive resistive element 90 below the design minimum resistance, a possible short circuit condition or other sensor malfunction is indicated. A warning device 120 operatively coupled to the processor 100 can then be activated to indicate a seat belt system malfunction.

Alternatively, if the processor means for measuring resistance detects a resistance through the force sensitive resistive element 90 above the design maximum resistance, a possible open circuit condition or other sensor malfunction is indicated. Similarly, a warning device 120 operatively coupled to the processor 100 can be actuated to indicate the malfunction.

In an alternative embodiment of the instant invention the force sensitive resistive element 90 acted upon by the pressure distribution bushing is utilized as one leg of a voltage divider circuit 110. FIGS. 4A and 4B show alternative arrangements for the location of the resistive element 90 in the voltage divider circuit 110. A known voltage $V_{in}$, such as may be supplied by a vehicle battery or other source of electrical potential, is applied across a series combination of the force sensitive resistive element 90 and a resistor of predetermined value R. The output of the voltage divider circuit 110 is a voltage, $V_{out}$, that is measured at a point or node between the resistor R and the force sensitive resistive element 90 and which varies depending upon the amount of force acting on the force sensitive resistive element 90. The processor 100 is therefore provided with a means for measuring and analyzing a variable voltage signal that is indicative of the state of the seat belt latch. The output of the voltage divider circuit, $V_{out}$, can be amplified, buffered, and/or compared prior to being analyzed in the processor, as is well understood by one having ordinary skill in the art.

The variable voltage $V_{out}$ will be proportional to, or inversely proportional to the amount of force applied to the force sensitive resistive element 90, depending upon the location of the force sensitive resistive element 90 in the voltage divider circuit 110. Referring to FIG. 4A, as applied force increases (i.e., a latched condition) the resistance through the force sensitive resistive element 90 decreases to a predetermined minimum. The output voltage $V_{out}$ may be calculated by the formula $V_{out}=V_{in}(R_s/R+R_s)$ where $R_s$ is the resistance of the force sensitive resistive element 90 for a given level of force applied. If R is chosen to have a relatively large resistance, for example, as resistance $R_s$ decreases $V_{out}$ approaches 0 volts. Thus for the voltage divider circuit 110 shown in FIG. 4(a), output voltage $V_{out}$ decreases when the latch assembly 40 is in a latched state.

Conversely, the voltage divider circuit of FIG. 4B provides for output voltage $V_{out}$ that increases when the latch assembly 40 is in a latched state. One of ordinary skill in the art will appreciate that either circuit configuration may be utilized depending upon the particular application.

Also well known to one of ordinary skill in the art, resistor R may be tuned to the operational range of the force sensitive resistive element 90 to provide a variation in voltage between the latched and unlatched positions that is large enough to be reliably measured by the processor 100. In one embodiment of the instant invention, R can be specified such that the voltage variation between the latched and unlatched positions of the latch arm 42 is wide enough that $V_{out}$ can be operatively coupled to a conventional digital input (not shown) of the processor 100. The disadvantage of this embodiment of the invention is that the ability to detect open circuit and short circuit conditions is generally not available when utilizing a digital input.

The output from the diagnosable seat belt latch system 10 can be used advantageously in a variety of ways by a safety restraint system. In the event the seat belt of an occupant is not latched, the processor 100 can activate a warning device 120 to indicate this condition to the occupant, possibly thereby encouraging the occupant to properly buckle the seat belt for enhanced safety. Furthermore, and possibly alternately, the processor 100 can control the activation of the safety restraint system responsive to the latching state of the seat belt buckle, whereby in the event that the seat belt buckle is properly latched, the associated air bag system 130 and seat belt pretensioner 140, if present, are activated responsive to a crash in a manner which provides optimal restraint for a belted occupant. Moreover, in the event that the seat belt buckle is not properly latched, the associated air bag system 130, if present, is activated responsive to a crash in a manner which provides optimal restraint for an unbelted occupant, and the seat belt pretensioner 140 is not activated.

While specific embodiments of the instant invention have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A diagnosable seat belt latch system for use in a vehicle seat belt assembly having a seat belt connected to a seat belt buckle, said buckle having an orifice therein, comprising:
   a.) a latch housing having a slot at one end for slidably engaging the seat belt buckle;
   b.) a latch assembly enclosed by said latch housing, comprising:
      i) a latch arm having a first end pivotally mounted to said housing, and a second end;
      ii) a latch tab depending from the second end of said latch arm for engaging the orifice of said seat belt buckle;
      iii) a first spring connected to said latch arm wherein said spring biases the second end of said latch arm towards the slot of said latch housing;
      iv) a pressure distribution bushing having first and second ends, the first end of said pressure distribution bushing operatively coupled to said latch arm; and
      v) a force sensor interposed between said housing and the second end of said pressure distribution bushing, wherein said bushing operates to distribute force from said latch arm to said force sensor, said force sensor having an output responsive to the force applied to said force sensor by said pressure distribution bushing; and
   c.) a processor operatively coupled to the output of said force sensor for determining from the output of said force sensor whether the latch tab is engaged with the orifice of the seat belt buckle.

2. A diagnosable seat belt latch system as recited in claim 1, wherein said force sensor incorporates a force sensitive resistive element.

3. A diagnosable seat belt latch system as recited in claim 2, wherein said force sensor further comprises:
   a resistor connected to said force sensitive resistive element at a node so as to form a series combination, whereby responsive to a source of electrical potential connected across said series combination the output of said force sensor is the electrical potential of said node.

4. A diagnosable seat belt latch system as recited in claim 1, wherein said processor further comprises a means for detecting open circuit and short circuit conditions of the output of said force sensor.

5. A diagnosable seat belt latch system as recited in claim 4, further comprising a warning device operatively coupled to said processor so as to activate said warning device when said latch tab is not engaged with the orifice of said seat belt buckle.

6. A diagnosable seat belt latch system as recited in claim 5, wherein said warning device is activated when at least one of said open circuit and short circuit conditions are present at the output of said force sensor.

7. A system for sensing the latching state of a vehicle seat belt assembly having a seat belt latch connected to a seat belt buckle, said buckle having an orifice therein, and for controlling a safety restraint system responsive thereto, comprising:
   a.) a latch housing having a slot at one end for slidably engaging the seat belt buckle;
   b.) a latch assembly enclosed by said latch housing, comprising:
      i) a latch arm having a first end pivotally mounted to said housing, and a second end;
      ii) a latch tab depending from the second end of said latch arm for engaging the orifice of said seat belt buckle;
      iii) a first spring connected to said latch arm wherein said spring biases the second end of said latch arm towards the slot of said latch housing;
      iv) a pressure distribution bushing having first and second ends, the first end of said pressure distribution bushing operatively coupled to said latch arm; and
      v) a force sensor interposed between said housing and the second end of said pressure distribution bushing, wherein said bushing operates to distribute force from said latch arm to said force sensor, said force sensor having an output responsive to the force applied to said force sensor by said pressure distribution bushing; and
   c.) a processor operatively coupled to the output of said force sensor for determining from the output of said force sensor whether the latch tab is engaged with the orifice of the seat belt buckle, whereby said processor generates a signal for controlling the safety restraint system responsive to whether said latch tab is engaged with the orifice.

* * * * *